Feb. 21, 1928.
W. F. BOKUM
1,660,249
WEIGHING FEEDER
Filed Feb. 29, 1924    3 Sheets-Sheet 1
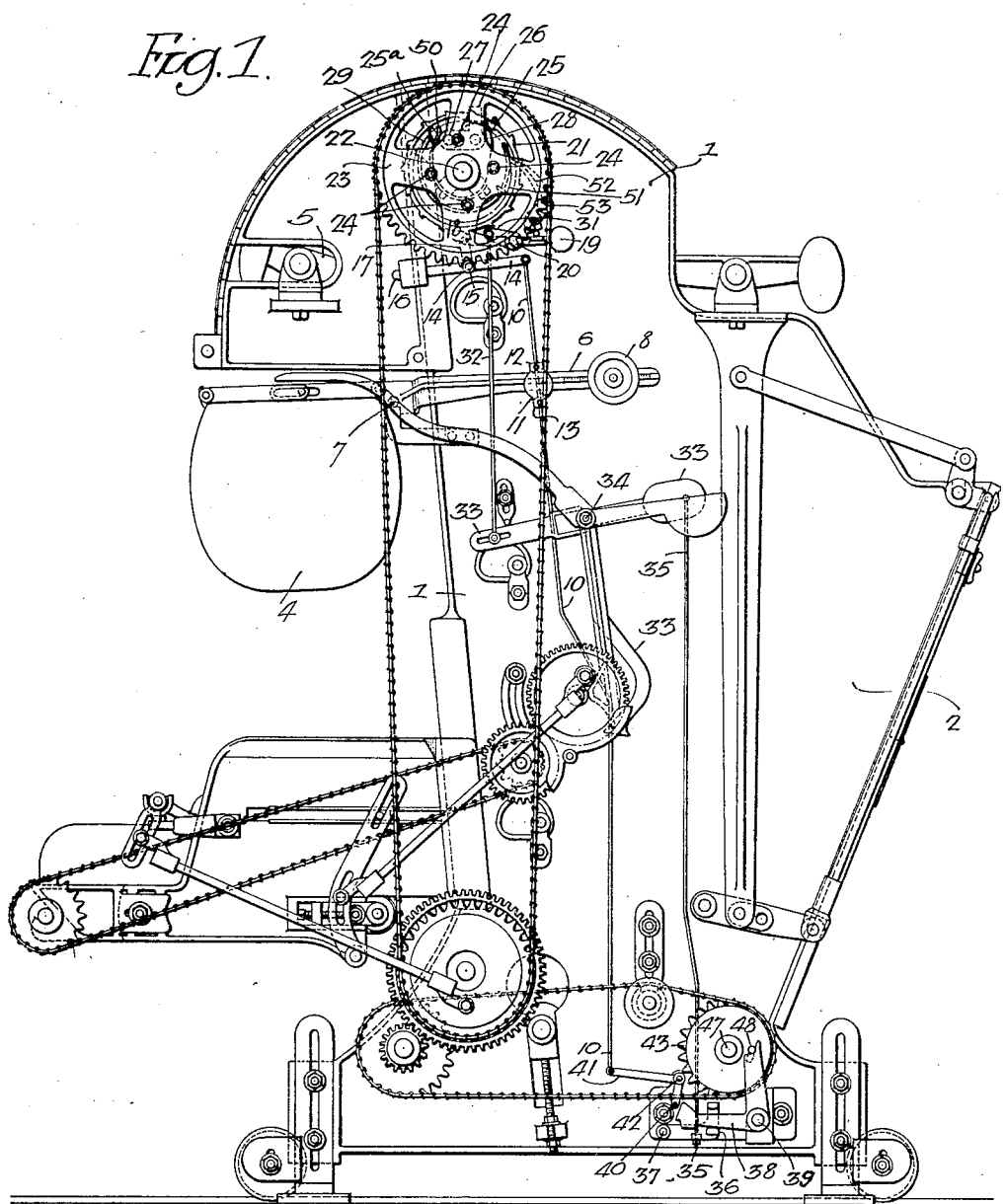
Fig. 1.
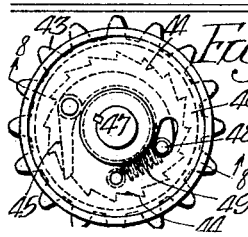 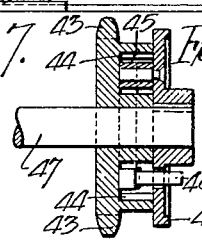
Fig. 7.    Fig. 8.
Inventor-
William F. Bokum,
by his Attorneys,—

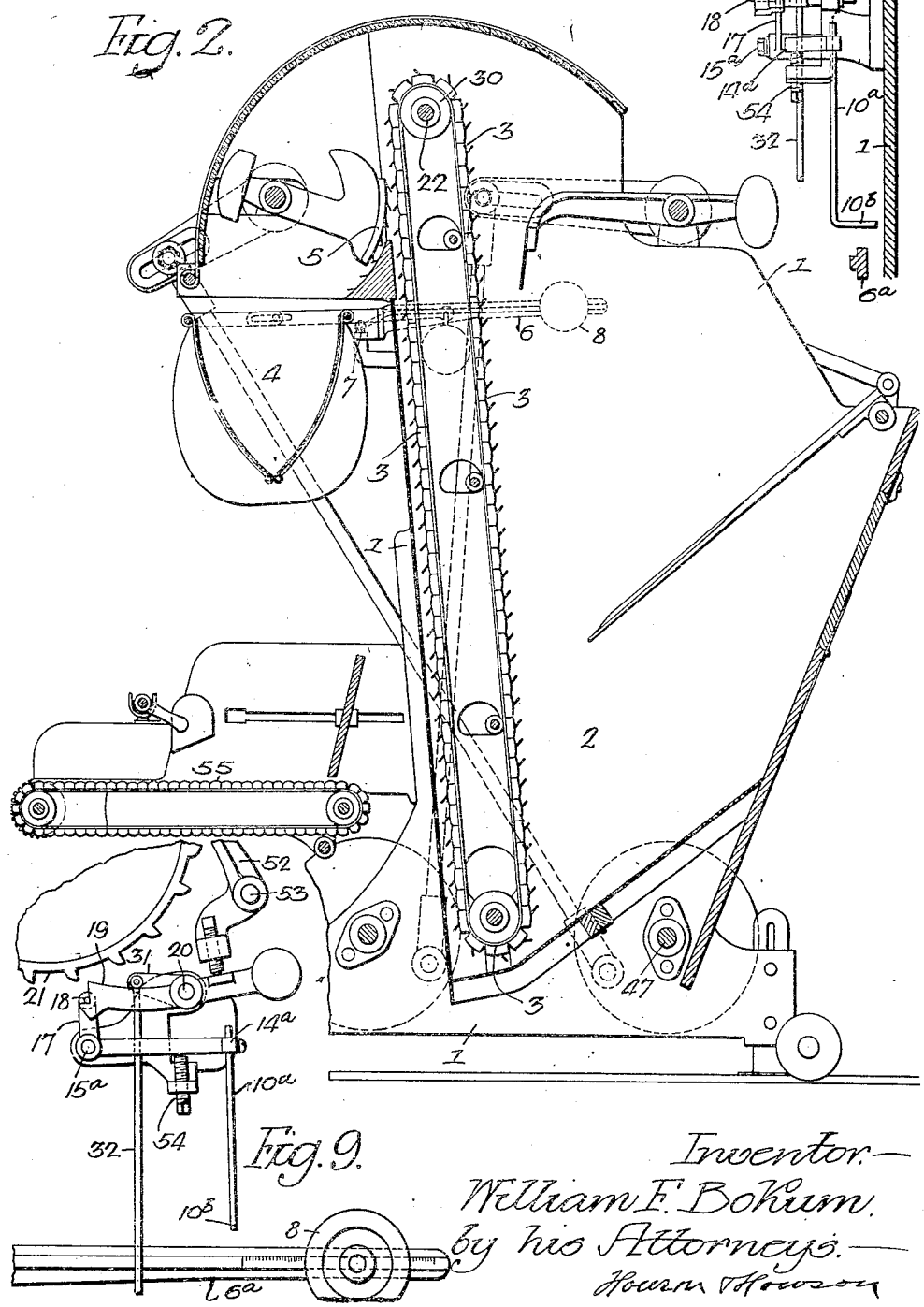

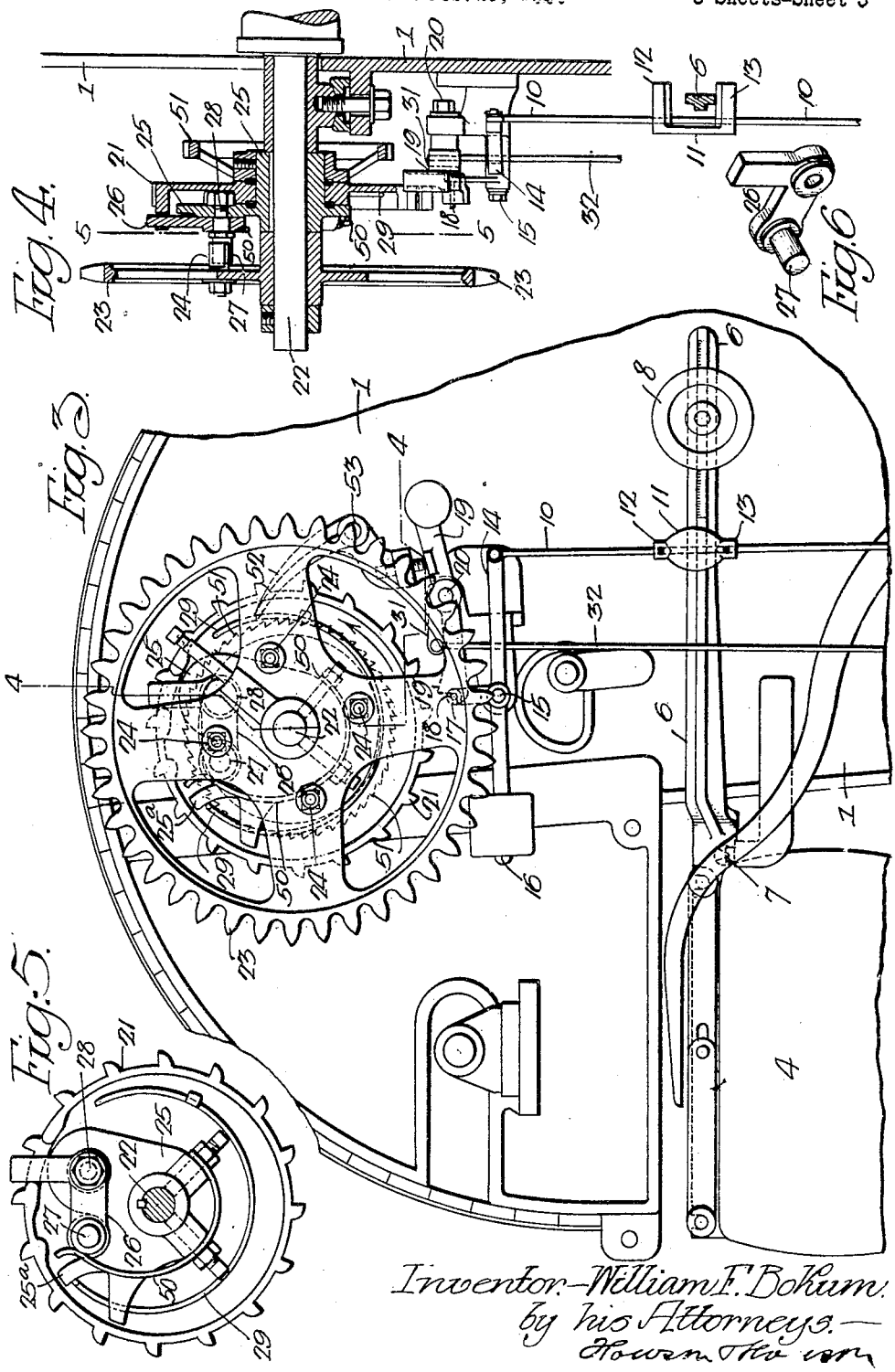

Patented Feb. 21, 1928.

1,660,249

UNITED STATES PATENT OFFICE.

WILLIAM F. BOKUM, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

WEIGHING FEEDER.

Application filed February 29, 1924. Serial No. 696,031.

My invention relates to certain improvements in self-weighing feeders for carding machines, in which the material is fed into a scale pan and weighed and released—the pan being returned automatically to position to receive more material to be weighed.

One object of the invention is to construct the mechanism so that the beam of the scale is disconnected from all mechanism during the weighing operation.

Another object of the invention is to construct the clutch mechanism so that the releasing and resetting are easily accomplished.

A further object of the invention is to provide means for automatically stopping and starting the comb when the feeding apron is stopped or started.

In the accompanying drawings:

Fig. 1 is a side view of a self-weighing feeder embodying my invention;

Fig. 2 is a vertical sectional view;

Fig. 3 is an enlarged side view of the main clutch mechanism;

Fig. 4 is a sectional view on the line 4—4, Fig. 3;

Fig. 5 is a sectional view on the line 5—5, Fig. 4;

Fig. 6 is a detached perspective view of the clutch bell crank lever;

Figs. 7 and 8 are detached views of the comb clutch

Fig. 9 is a view illustrating the arrangement of the actuating rod and its lever when the mechanism is used for stopping and starting the feed mechanism only; and Fig. 10 is a side view of a portion of Fig. 9, showing the beam in section.

Referring to the drawings, 1 is the frame of a self-feeder, arranged, in the present instance, to feed cotton, or other material, to a carding machine. In the frame is a hopper 2 for the material. At the front of the hopper is an endless apron 3, which has pins, or teeth, that engage the cotton and carry it from the hopper 2 to a point above a scale pan 4. A comb 5 removes the material from the apron and feeds it to the scale pan.

Some grades of material free themselves from the apron without the use of a comb. Therefore, machines are made with and without the combing mechanism. Under the scale pan is an endless belt conveyer 55 onto which the material is discharged from the pan. The conveyer carries the material to a carding, or other machine.

The driving mechanism for the machine is shown clearly in Fig. 1. This mechanism will not be described, as it is that used ordinarily in a machine of this type.

The scale pan is mounted on one end of a scale beam 6, which is pivoted at 7 to the frame of the machine in the ordinary manner. On the beam is an adjustable weight 8. The usual means is provided for opening the scale pan to discharge the material. A rod 10 is attached to one arm of a lever 14 and extends past the scale beam 6. On the rod is a block 11, which has two stops 12 and 13, between which the beam extends. The beam 6 is entirely free of the mechanism when the weighing operation takes place so that an accurate weight is the result.

When the weighted arm of the beam 6 is raised, it comes in contact with the upper stop 12, raising the rod 10. When the beam is lowered, it comes in contact with the stop 13.

The lever 14 is pivoted at 15 and has a weighted arm 16 and an arm 17, which is provided with a pin 18. The pin 18 engages a notch in a dog 19, which is pivoted at 20. The tooth of this dog—when the dog is released—engages one of the teeth of a ratchet wheel 21, which is loosely mounted on a shaft 22. On the shaft 22 is a drum 30, around which passes the toothed feeding apron 3, Fig. 2.

Loose on the shaft 22 is a driven sprocket wheel 23. This wheel has four driving pins 24, in the present instance. On a hub 25, secured to the shaft 22, is a bell crank lever 26, pivoted at 28, and having, on one arm, a pin 27, which can be moved into and out of the path of the driving pins 24. The other arm of the lever 26 extends through an opening in the ratchet wheel 21, Fig. 5. A spring 29, attached to the ratchet wheel, presses against an arm 25ª of the hub 25, and tends to hold the pin 27 in the path of the driving pins.

When the ratchet wheel 21 is stopped by the dog 19, the bell crank lever 26 is turned on its pivot, moving the pin 27 out of the path of the driving pins and stopping the rotation of the shaft 22 on which is mounted the drum 30, thus stopping the movement of the apron 3. When the movement of the apron is stopped, the feed of material to the weighing hopper ceases until the load in the hopper is discharged, which causes the beam to turn on its pivot, the long arm of the beam striking the stop 13 on the rod 10. In the meantime, the dog 19 is retracted by mechanism, which will be hereinafter described, and is in position to be engaged by the pin 18, as in Fig. 3.

The movement, above described, frees the sprocket wheel and the pin 27 is moved by the spring 29 into the path of the pins 24 on the driven sprocket wheel 23, and the feeding mechanism is set in motion. A spring 50 is secured to the hub 25 and is so shaped as to hold the pin 27 out of engagement with the driving pins when the pin 27 has been disengaged. The spring yields when the pin is forced into the notch of the hub. Secured to the hub 25 is a ratchet wheel 51. This wheel is engaged by a pawl 52, which is pivoted at 53 to the frame of the machine. The pawl is moved into engagement with the ratchet wheel 51 when the dog 19 is released in order to prevent the backward movement of the apron due to the load thereon. A connection is made between the apron clutch mechanism and the mechanism for actuating the comb in order to stop the movement of the comb 5 when the feeding apron 3 is stopped.

On the dog 19 is an arm 31 to which a rod 32 is connected. This rod is attached to an arm of a resetting lever 33, which is pivoted at 34. Connected to the other arm of the lever is a rod 35, which engages an arm 36, which is pivoted at 37. This arm has lugs between which one arm of a dog 38 extends. The dog is pivoted at 39. The arm of the dog is notched at the end to receive a retaining pin 40, which is carried by one arm of a bell crank lever 41, which is pivoted at 42. The other arm of the lever 41 is attached to the lower end of the rod 10.

Loose on the shaft 47 is a driven sprocket wheel 43. This wheel has internal ratchet teeth 44, engaged by a pawl 45 on a carrier 46, which is secured to the shaft 47. The shaft 47 operates the comb 5, which strips material from the endless apron 3. When the travel of the apron 3 is stopped, the movement of the comb is stopped through the mechanism above described. When the dog 38 is released by the movement of the rod 10, it engages a pin 48, which is connected to the pawl 45, and moves it in the slot of the carrier 46 against a spring 49, causing the pawl to move out of engagement with the ratchet teeth of the sprocket wheel 43.

When the load is discharged from the weighing hopper, the dog 38 is withdrawn and is held out of the path of the pin 48, allowing the sprocket wheel 43 to turn the shaft 47 through the pawl 45.

In some types of machines, it is only necessary to stop the movement of the feeding apron. In such a case, the means for actuating the comb, or other device, are not connected to the mechanism controlling the apron.

In Figs. 9 and 10, the trip rod 10ª is attached to an arm of a lever 14ª, pivoted at 15ª. The rod 10ª terminates in a right angled bend 10ᵇ, directly above the scale beam 6ª so that the beam, when raised, actuates the rod. The shape of the rod may vary without departing from the invention.

A set screw 54 on the bracket carrying the lever 14ª regulates the position of the lever.

By the construction hereinbefore described, the mechanism is stopped and started positively at the proper time as dictated by the scale beam, insuring accurate weighing of the material. The driven pin is moved into the path of the driving pins at the proper moment, and the scale—being free of other mechanisms, while weighing—insures an accurate balance.

I claim:

1. The combination in a weighing feeder, of a hopper; an endless apron for removing material from the hopper; a comb for removing material from the apron; a scale beam; a weighing hopper on the beam arranged to receive material combed from the apron; means for driving the apron; and mechanism for disconnecting the driving means from the apron and the comb, said mechanism consisting of a rod having stops, one stop being located above the beam and the other being located below the beam so that the beam, in weighing, is free of the mechanism until it comes against a stop, which causes a movement of the rod that controls the mechanism between the driving means, the apron and the comb.

2. The combination in a weighing feeder, of a pivoted scale beam; a weighing hopper mounted on one arm of the beam; means for feeding material to the hopper; a driven wheel for imparting motion to the feeding mechanism, said wheel having a driving pin thereon; a hub; a lever pivoted on the hub and having a pin arranged to be moved into and out of the path of the driving pin; a ratchet wheel engaging an arm of the lever; a dog arranged to engage the ratchet wheel and hold it so as to move the pin of the lever out of the path of the driving pin; a lever arranged to engage the dog and hold it out of action; and a rod connected to said lever and arranged to be shifted by the movement of the scale beam.

3. The combination in a weighing feeder, of a pivoted scale beam; a weighing hopper on the beam; means for feeding material to the weighing hopper; driving means for the feeding means, said driving means consisting of a wheel having a driving pin; a shaft on which the feeding means is mounted; a hub secured to the shaft; a lever pivoted to the hub, one arm of the lever having a pin arranged to be moved into the path of the driving pin; a ratchet wheel having a pin to receive the other arm of the lever; and a dog arranged to engage the ratchet wheel.

4. The combination in a weighing feeder, of a beam; a weighing hopper; means for feeding material to the hopper; driving mechanism for the said feeding means, said driving means consisting of a wheel having a driving pin; a shaft on which the wheel is mounted; a hub secured to the shaft; a two-armed lever pivoted to the hub, one arm of said lever having a pin arranged to be moved into the path of the pin on the driving wheel; a ratchet wheel engaging the other arm of the lever; a spring on the ratchet wheel bearing against a projection on the hub; a dog engaging the ratchet wheel; a lever having a pin engaging the dog to hold it out of action; and a rod on the lever extending into position to be actuated by the beam when the load is being weighed.

5. The combination in a weighing feeder, of a frame; a scale beam mounted thereon; a weighing hopper carried by the beam; a hopper for material; an apron for removing the material from the hopper; means for driving the apron, said means consisting of a wheel having a driving pin; a comb for removing material from the apron; means for driving the comb independently, said means consisting of a wheel; mechanism between the apron and its driving wheel, said mechanism being controlled by the beam; and mechanism between the driving wheel and the comb, also controlled by the beam.

6. The combination in a weighing feeder, of a beam; a scale pan on the beam; means for feeding material to the pan; a driving wheel having driving pins; a shaft; a hub secured thereto; a bell crank lever on the hub, said bell crank lever having a pin on one arm arranged to be engaged by one of the driving pins; a ratchet wheel loose on the hub, said ratchet wheel having an opening for the other arm of the bell crank lever; a second ratchet wheel secured to the hub; a pawl arranged to engage said last mentioned ratchet wheel; a dog arranged to engage the first mentioned ratchet wheel and the pawl; and means for holding the dog clear of its ratchet wheel, said means being controlled by the scale beam.

WILLIAM F. BOKUM.